(12) United States Patent
Trabandt et al.

(10) Patent No.: US 7,837,154 B2
(45) Date of Patent: Nov. 23, 2010

(54) DEPLOYABLE HEAT SHIELD AND DECELERATION STRUCTURE FOR SPACECRAFT

(75) Inventors: Ulrich Trabandt, Bremen (DE); Manfred Schmid, Immenstaad (DE)

(73) Assignee: Astrium GmbH, Ottobrunn (DE)

( * ) Notice: Subject to any disclaimer, the term of this patent is extended or adjusted under 35 U.S.C. 154(b) by 532 days.

(21) Appl. No.: 11/903,566

(22) Filed: Sep. 20, 2007

(65) Prior Publication Data
US 2008/0078884 A1 Apr. 3, 2008

(30) Foreign Application Priority Data
Sep. 30, 2006 (DE) .................. 10 2006 046 572

(51) Int. Cl.
*B64G 1/00* (2006.01)
(52) U.S. Cl. ............... 244/159.1; 244/171.7; 244/172.6
(58) Field of Classification Search ............. 244/159.1, 244/171.7, 172.6
See application file for complete search history.

(56) References Cited

U.S. PATENT DOCUMENTS

| | | | | |
|---|---|---|---|---|
| 2,466,595 A | * | 4/1949 | Korman | .................. 52/73 |
| 3,047,259 A | * | 7/1962 | Tatnall et al. | ........... 244/138 A |
| 3,301,507 A | * | 1/1967 | Mayo et al. | ............... 244/159.3 |
| 3,715,760 A | * | 2/1973 | Palmer | ........................ 343/915 |
| 4,832,288 A | | 5/1989 | Kendall et al. | |
| 4,896,847 A | | 1/1990 | Gertsch | |
| 5,064,151 A | * | 11/1991 | Cerimele et al. | ......... 244/172.1 |
| 5,108,047 A | * | 4/1992 | Puech | ........................ 244/113 |
| 6,735,842 B1 | | 5/2004 | Wildenrotter et al. | |
| 7,669,802 B2 | * | 3/2010 | Dorman | .................. 244/158.1 |

FOREIGN PATENT DOCUMENTS

DE    691 01 021    5/1994

* cited by examiner

*Primary Examiner*—Timothy D Collins
*Assistant Examiner*—Philip J Bonzell
(74) *Attorney, Agent, or Firm*—W. F. Fasse; W. G. Fasse

(57) ABSTRACT

An apparatus for heat shielding and deceleration of a spacecraft comprises an unfoldable shield of individual panels made of a high temperature resistant fiber reinforced ceramic and pivotally mounted on the outer structure of the spacecraft. An unfolding ring slides axially along the body of the spacecraft. The panels are pivotally connected to the unfolding ring by compression struts acting as toggle levers. Tension springs pull the unfolding ring axially along the spacecraft body to toggle out the compression struts so as to outwardly pivotally deploy the panels. The unfoldable shield can be arranged on the forward end or the rear end of the spacecraft relative to its flight direction upon entry into the atmosphere.

23 Claims, 6 Drawing Sheets

DEPLOYABLE HEAT SHIELD AND DECELERATION STRUCTURE FOR SPACECRAFT

PRIORITY CLAIM

This application is based on and claims the priority under 35 U.S.C. §119 of German Patent Application 10 2006 046 572.5, filed on Sep. 30, 2006, the entire disclosure of which is incorporated herein by reference.

FIELD OF THE INVENTION

The invention relates to an apparatus for thermal protection and deceleration of spacecraft upon entry of the spacecraft into an atmosphere. The spacecraft can be any type of space vehicle or flying body that is to enter or reenter the atmosphere of the earth or another planet or a planetary moon at a high speed, for which thermal protection and deceleration of the spacecraft are needed.

BACKGROUND INFORMATION

Upon entry of spacecraft into the atmosphere of the earth or other planets or planetary moons, heat shields and/or deceleration structures are needed for decelerating the spacecraft and protecting it from excessive heat due to the arising frictional heating as the spacecraft passes through the atmosphere. New spacecraft planned for future space missions are relatively large and heavy in comparison to present spacecraft, so that such future spacecraft will not always be sufficiently protected by the current conventional heat shield arrangements that are mounted directly on the surface of the spacecraft. For example, such conventional arrangements involve heat-resistant ceramic tiles, heat ablatable materials and/or heat insulation materials mounted on the surface of the spacecraft. Also, relatively large heat resistant braking shields, parachutes or umbrellas and/or heat shields that protrude outwardly beyond the dimensions of the spacecraft itself will be needed. However, due to the substantial size of such arrangements, it is difficult or impossible to accommodate such arrangements in a launch rocket or in a cargo bay of the spacecraft during the launch and space mission thereof before atmospheric entry when the arrangement must be deployed.

In view of the above, inflatable flexible structures of various configurations have become known as heat shield and deceleration structures, for example as disclosed in U.S. Pat. No. 4,832,288 (Kendall et al.). To achieve the required heat resistance to withstand the high heat loads arising upon entry into the atmosphere, such inflatable flexible structures either must be provided with an ablative heat protection arrangement, or must be inflated to form a very large balloon structure of heat resistant material. These known systems, however, often suffer the disadvantage of a very high volume in the stowed condition before deployment, a very high energy demand for deployment, and a high mass especially due to the necessary compressed gas tanks containing the compressed gas needed for inflation.

To address the above disadvantages, the German Patent Publication DE 691 01 021 T2 (translation of EP 0 453 361) discloses an apparatus for thermal protection and deceleration of a spacecraft upon entry into the atmosphere, including an unfoldable deployable shield in the form of a foldable structure of high temperature resistant panels that are deployably mounted on the outside structure of the spacecraft. This arrangement requires relatively little space compared to other conventional arrangements. The panels have various different shapes and are articulately connected with one another, and are unfoldable or deployable to form a contiguous or interconnected umbrella, parachute or shield by operation of a common actuating apparatus. This arrangement is relatively complex in structure and operation.

Furthermore, in the field of satellite construction, various different foldable structures for large antennas in terrestrial and orbital applications are known. These foldable antenna structures, however, consist of conventional fiber reinforced composite materials and are only suitable for small temperature fluctuations of about ±50° C. and for relatively low mechanical loading. Namely, such foldable antenna structures are not suitable for heat shields and deceleration structures for spacecraft entering the atmosphere.

SUMMARY OF THE INVENTION

In view of the above, it is an object of the invention to further develop an apparatus of the above discussed general type with a foldable structure for heat protection and deceleration of a spacecraft, to have the lightest possible construction with a space-saving folded condition. Furthermore, the apparatus shall achieve the greatest possible stability and resistance to the arising loads as well as a functional integrity. The invention further aims to avoid or overcome the disadvantages of the prior art, and to achieve additional advantages, as apparent from the present specification. The attainment of these objects is, however, not a required limitation of the claimed invention.

The invention achieves the above objects in an apparatus for heat protection and deceleration of a spacecraft comprising an unfoldable deployable shield in the form of a foldable structure that is to be unfolded and deployed upon entry of the spacecraft into an atmosphere. The foldable structure comprises high temperature resistant panels that are mounted on the outer structure of the spacecraft body of the spacecraft. Particularly, the foldable structure comprises a plurality of individual panels that respectively overlap one another along their longitudinal edges in the unfolded deployed condition.

The apparatus according to the invention further has several technical advantages. For example, the relatively low mass of the inventive apparatus achieves a weight reduction of about 50% relative to the known heat shield and deceleration apparatuses for spacecraft, especially relative to foldable structures with an ablation arrangement or relative to inflatable foldable chamber systems with such an ablation arrangement. Due to this weight reduction, even relatively small payload carriers or launch vehicles can receive and carry an apparatus comprising a folded system according to the invention. Also due to the weight savings achieved through use of the foldable structure according to the invention, a larger or heavier total useful payload can be received and carried in the vehicle and therefore be transported in a more economical manner. The inventive apparatus also makes it possible to utilize small space capsules, which otherwise would quickly become too hot without a large heat shield and would therefore be too risky for use by astronauts or useful payloads. Furthermore, the inventive apparatus, in addition to the braking or decelerating effect, can also provide a flight path stabilizing function for the spacecraft as it enters and flies through the atmosphere.

Thus, the apparatus according to the invention combines several very different functions. It ensures a secure and reliable unfolding deployment of the individual heat shield panels to form a self-stiffening aerodynamic braking shield or parachute-like structure that can surely take-up the arising high deceleration loads. Also, the individual shield panels respectively comprise heat resistant material that does not melt, vaporize, burn-up or degrade during the frictional braking in the atmosphere. Thus, the inventive apparatus does not cause pollution of the atmosphere due to thermal ablation of the heat shield material during entry into the atmosphere, as this can be the case with conventional heat shield systems. Furthermore, the inventive apparatus has an extremely light weight and stiff structure, so that the useful payload of the spacecraft can be as large and as heavy as possible.

In a preferred embodiment, the panels of the inventive apparatus are fabricated of carbon fiber reinforced ceramic (e.g. C/SiC), which on the one hand is lighter than the lightweight construction material aluminum, and which on the other hand has a strength and stiffness comparable to those of aluminum. Moreover, the strength of this material increases by about 10% at elevated temperatures up to 1600° C.

The unfolding or deployment and locking mechanism of the apparatus according to the invention is constructed in such a stiff and robust manner so that it still functions surely and reliably even in the event of a deformation of the reinforcing structure due to thermally induced tensions in the structure in orbit, for example on the sun-exposed side of the spacecraft relative to the shadow side thereof, and also so that the unfolding and locking mechanism does. not fail under the very high thermal and mechanical loads during entry into the earth's atmosphere or into the atmosphere of a different heavenly body, by which temperatures up to 1700° C. can arise.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND THE BEST MODE OF THE INVENTION

Figure 1:
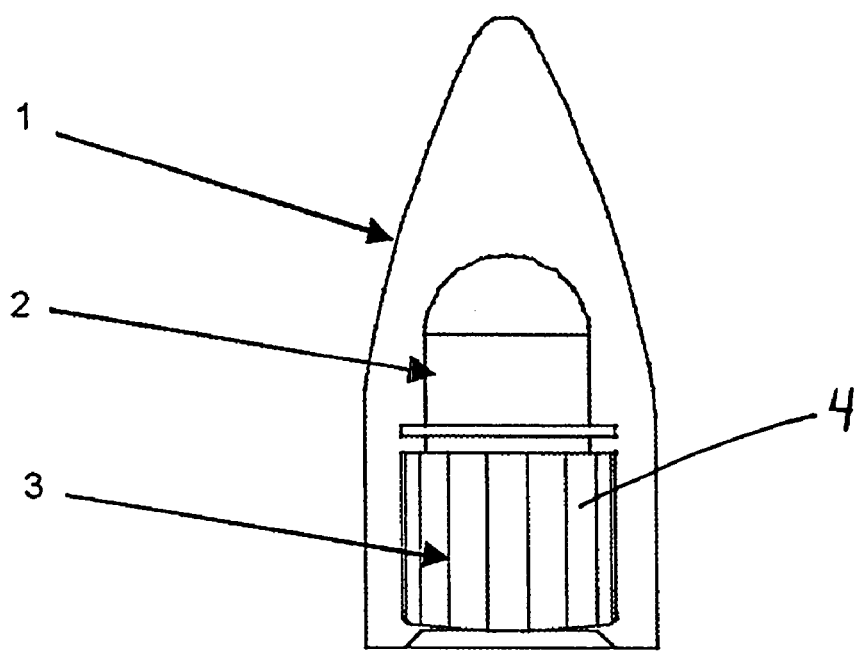
FIG. 1 is a schematic ghost view of the nose cone of a launch rocket carrying therein a useful payload in the form of a spacecraft or particularly a reentry vehicle with a folded stored heat shield arrangement.

FIG. 1 shows the nose cone portion of a launch rocket 1 carrying a useful payload 2 in the form of a spacecraft and particularly a reentry vehicle 2. The reentry vehicle 2 is outfitted or equipped with a foldable deployable heat shield arrangement 3 on the portion of the reentry vehicle 2 that faces forward in the flight direction during entry of the vehicle 2 into a planet's or moon's atmosphere. The heat shield arrangement 3 is stowed in a folded condition in the interior of the nose cone of the rocket 1.

Figure 2:
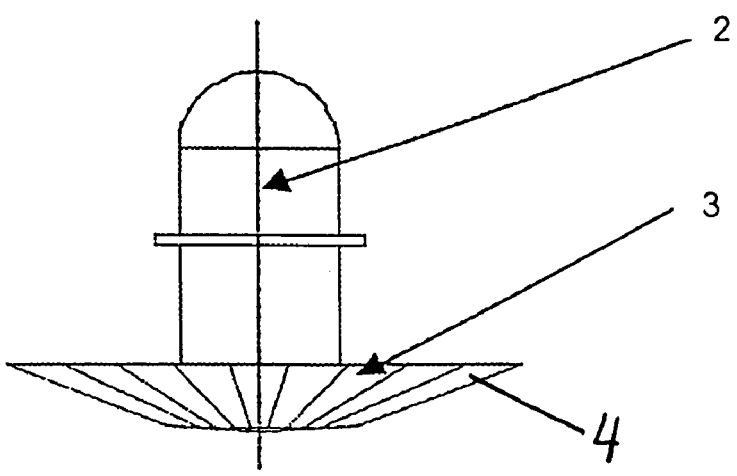
FIG. 2 is a schematic side view of the reentry vehicle according to FIG. 1 after separation from the launch rocket and with an unfolded deployed heat shield arrangement.

FIG. 2 shows the reentry vehicle 2 after its release outside of the rocket 1, whereby the heat shield arrangement 3 has been unfolded, deployed and extended into a configuration to carry out its heat shielding and decelerating functions as the reentry vehicle 2 enters into the earth's atmosphere or the atmosphere of a different heavenly body. The heat shield arrangement comprises a plurality of individual panels 4 that are movably mounted on the structure of the reentry vehicle 2 in an unfoldable deployable manner as will be described in further detail below.

Figure 3:
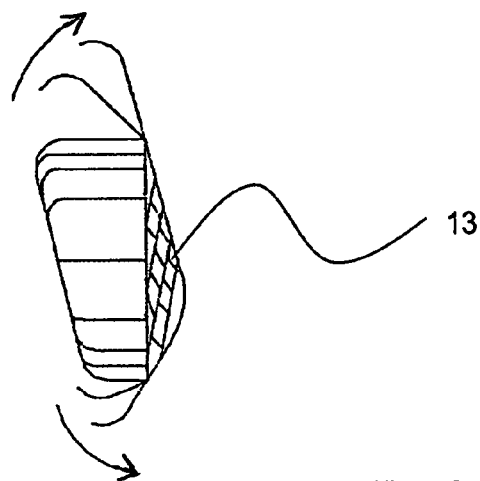
FIG. 3 is a schematic side view of a different useful payload equipped with a heat shield arrangement that is not rotationally symmetrical, in a folded stored condition.
Figure 4:
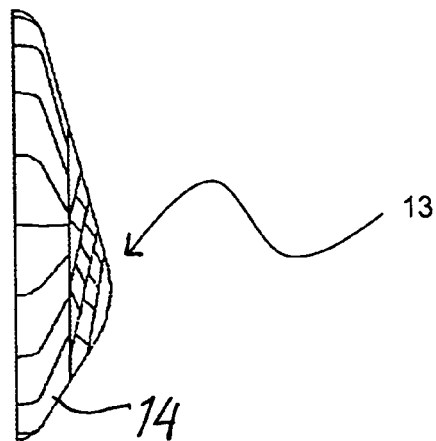
FIG. 4 is a view similar to that of FIG. 3, but showing the heat shield arrangement in a partially or fully opened condition.
Figure 5:
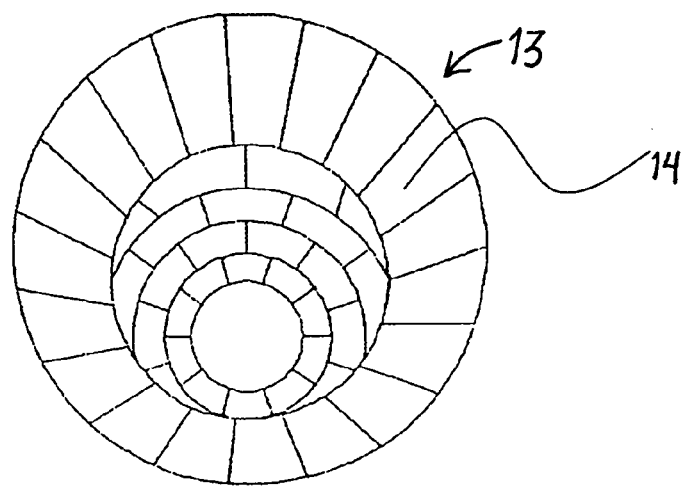
FIG. 5 is a top plan view of the heat shield arrangement according to FIGS. 3 and 4 in a fully opened condition.

FIGS. 3 to 5 show a different embodiment of a heat shield arrangement 13 during the unfolding deployment process thereof, namely in a folded condition, a partially opened condition, and a fully opened condition. In this embodiment, the individual panels 14 of the heat shield arrangement 13 are configured and arranged relative to one another in a manner that is not rotationally symmetrical. In other words, this heat shield arrangement 13 is non-rotationally-symmetrical. This heat shield arrangement 13 can similarly be mounted on the flight-forward end of a reentry vehicle, and simultaneously serves the purposes of a heat shield, a braking or decelerating shield, chute or umbrella, and a stabilizer. In this regard, the heat shield arrangement 13 is especially advantageous for spacecraft that enter the atmosphere at a relatively flat angle, e.g. an acute angle, whereby the non-rotationally-symmetrical configuration and arrangement of the panels 14 contribute to a stabilization or directional influencing of the flight path of the spacecraft in the entry phase as it enters the atmosphere.

Figure 6:
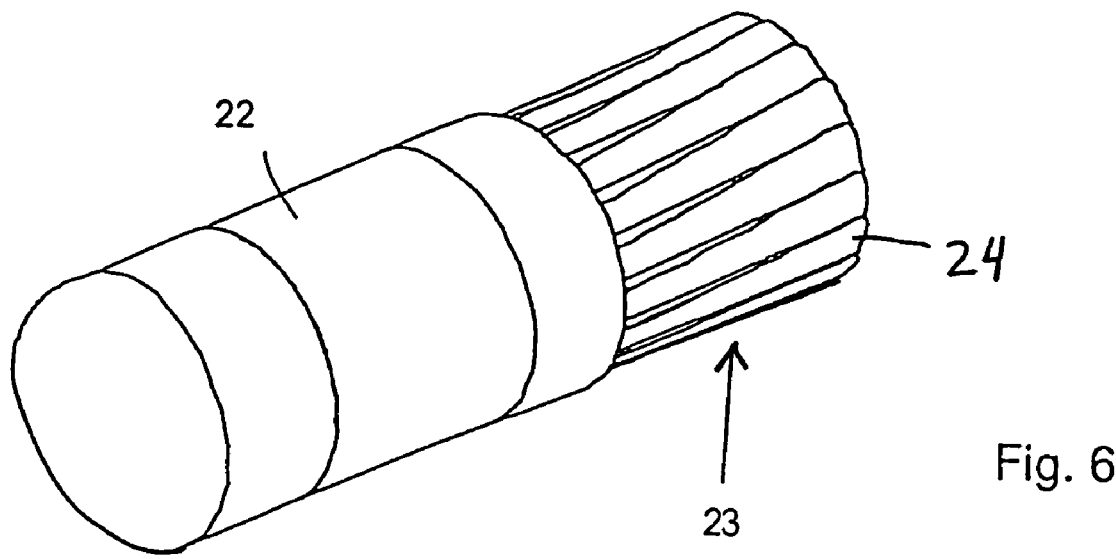
FIG. 6 is a schematic perspective view of a reentry vehicle with a foldable deployable structure that serves both as a stabilizer and a decelerating shield or chute in the deployed condition, but shown in the folded stored condition with panels that are folded relative to one another and rotated overlappingly into one another so as to collapse the structure.
Figure 6A:
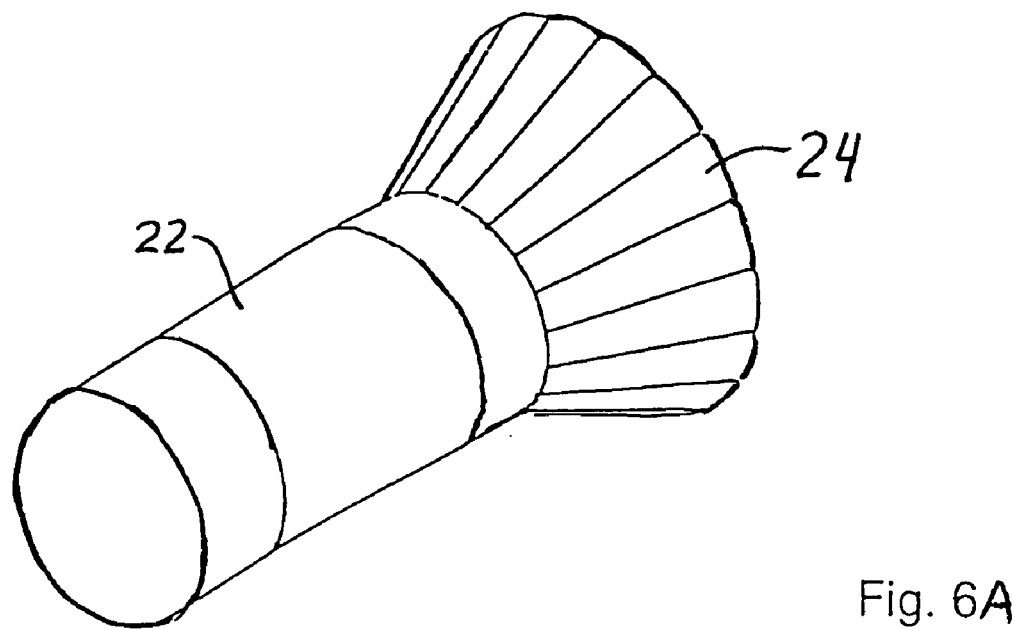
FIG. 6A is a schematic perspective view of the reentry vehicle according to FIG. 6, with the foldable deployable structure in the unfolded deployed condition in which the panels are extended yet remain mutually overlapping along longitudinal edges thereof.
Figure 7:
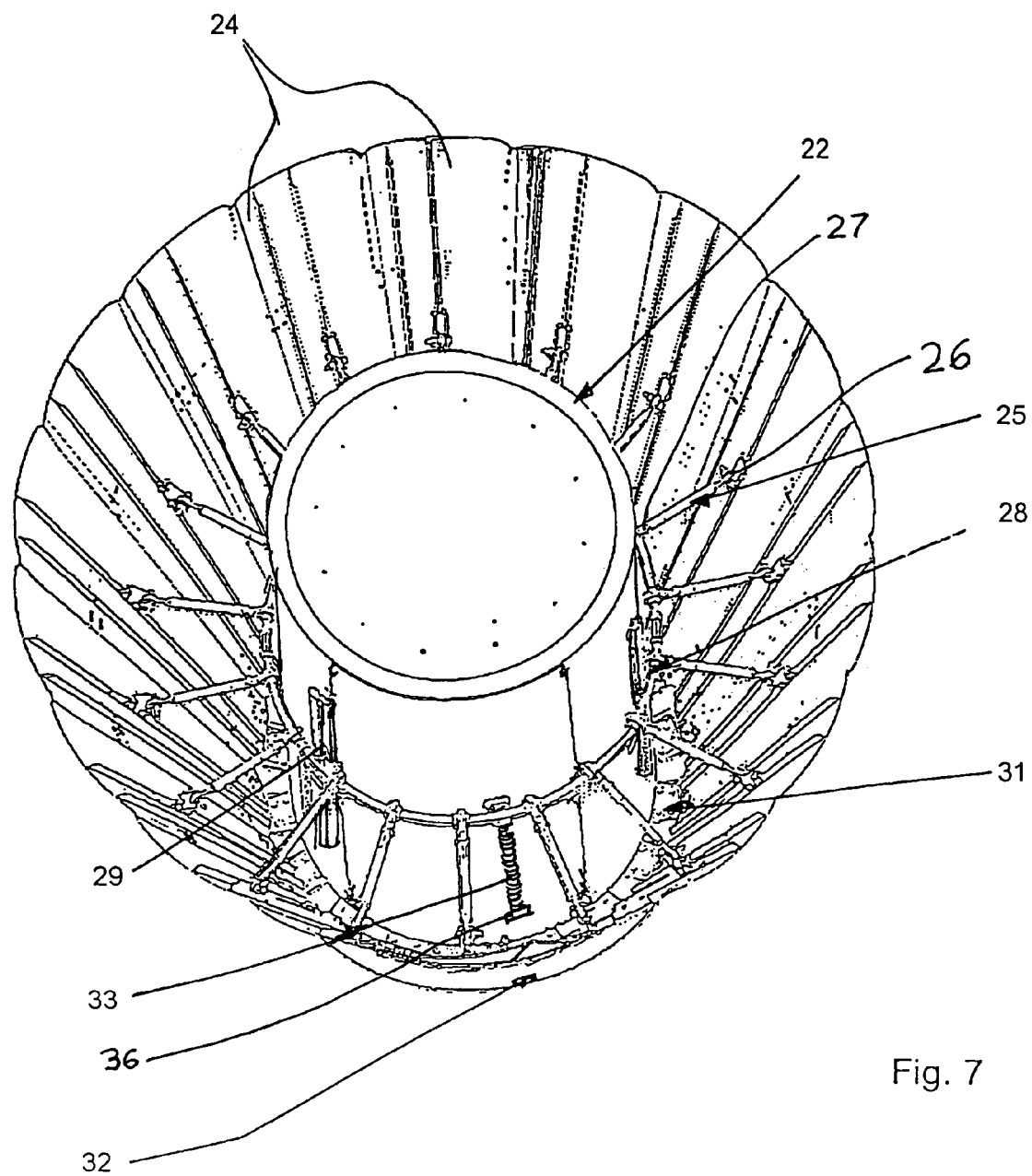
FIG. 7 is a schematic perspective view onto the end of the tail part of the reentry vehicle of FIG. 6, with the foldable deployable structure in the opened condition.

The perspective view of FIG. 6 shows a further reentry vehicle 22 with a foldable deployable structure 23, which, in the present embodiment, is arranged on that portion of the spacecraft or reentry vehicle that is oriented toward the rear or at the trailing end relative to the flight direction as the spacecraft enters the atmosphere. The foldable deployable structure 23 serves simultaneously as a braking or decelerating shield or chute and as a stabilizer, when the reentry. vehicle 22 enters the atmosphere. FIG. 6 shows this foldable deployable structure 23 in the folded stowed condition in which the foldable panels 24 are overlapped, rotated into one another about an axis of the vehicle 22, and collapsed into the stowed folded condition. On the other hand, FIG. 6A shows the foldable deployable structure 23 partially opened and surrounding a rear or trailing end portion of the reentry vehicle 22. These FIGS. 6 and 6A do not show the unfolding and locking mechanism by which the foldable deployable structure 23 is deployed from the folded condition in FIG. 6 to the partially unfolded condition shown in FIGS. 6A and 7. FIG. 7 is a perspective end view of the arrangement of FIG. 6A, in which the rear or trailing end of the reentry vehicle 22 surrounded by the partially deployed structure 23 is visible. FIG. 7 also shows the unfolding and locking mechanism, by which the foldable deployable structure 23 is deployed from the folded condition of FIG. 6, through the partially unfolded condition of FIGS. 6A and 7, to a completely unfolded deployed condition. This mechanism will be shown and discussed in further detail below.

Figure 11:
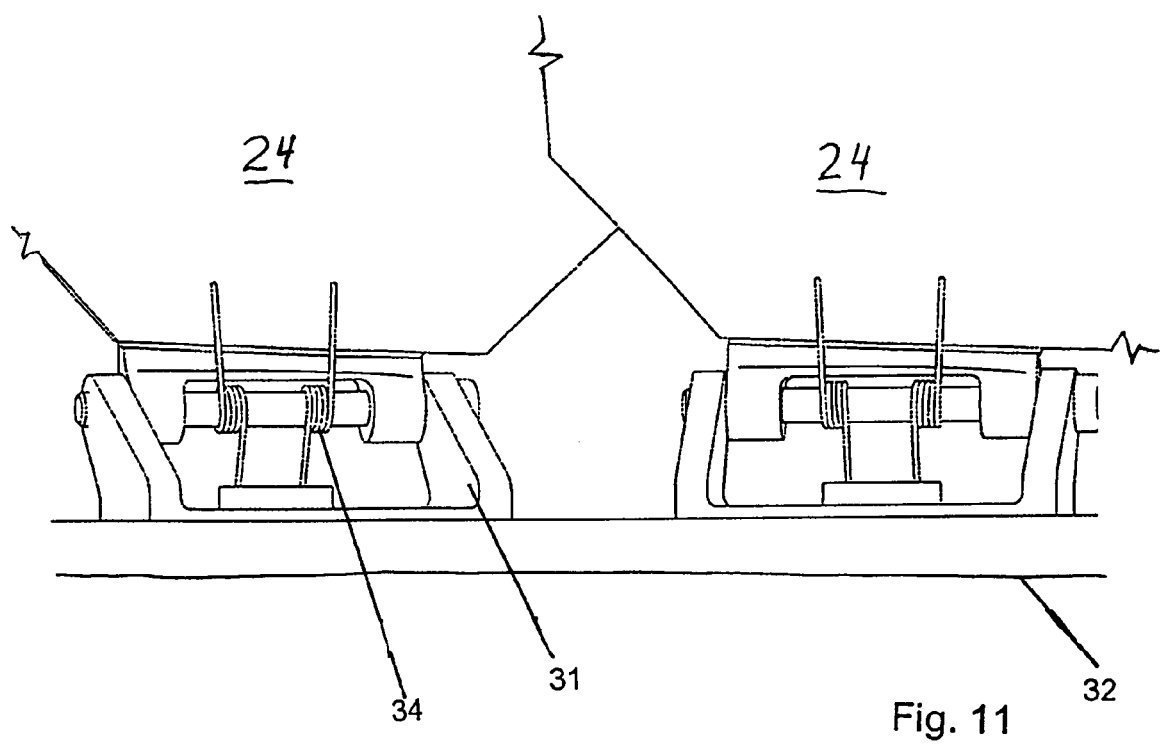
FIG. 11 is an enlarged detail view of a portion of the arrangement according to FIGS. 6 to 10, showing the pivoting attachment of the inboard ends of the panels to the reentry vehicle.
Figure 12:
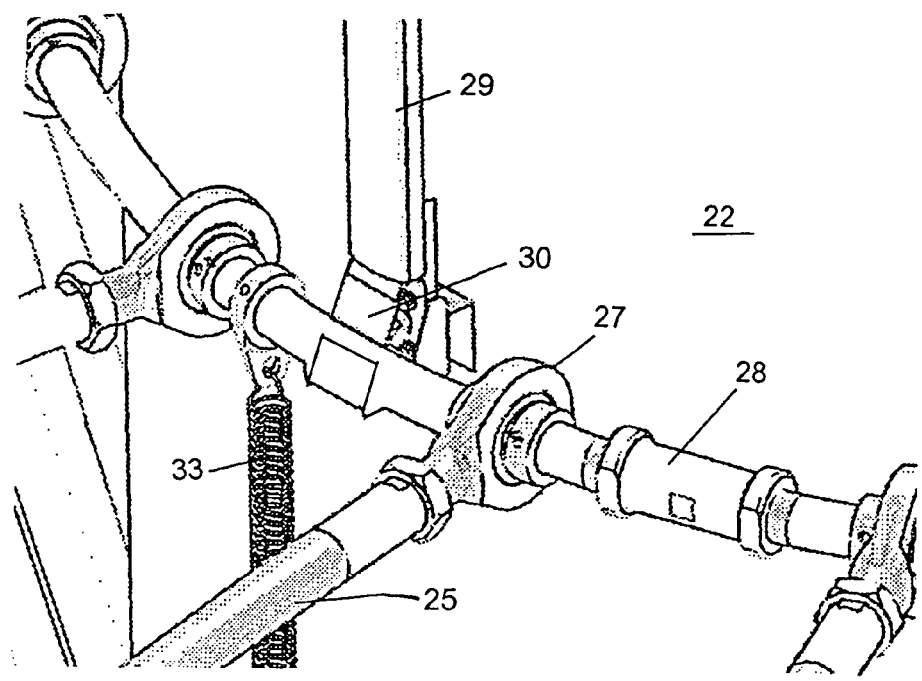
FIG. 12 is an enlarged detail view of a portion of the arrangement of FIGS. 6 to 10, showing a portion of the unfolding deployment and locking mechanism.

The foldable deployable structure 23 comprises a number of individual panels 24 that are each fabricated of high temperature resistant fiber reinforced ceramic, and may be further reinforced with reinforcement ribs extending longitudinally. In the unfolded deployed condition, these ceramic panels 24 form a stable continuous shield, which is sufficiently strong and rigid to withstand the high deceleration loads that arise during entry of the spacecraft into the atmosphere. The respective inboard end of each panel 24 is pivotably connected with the structure of the reentry vehicle 22. For example, as especially shown in FIG. 11, the inboard end of each panel 24 is pivotally connected by a pivot bearing arrangement or pivot hinge 31 to a ring structure 32 of the structural body of the reentry vehicle 22. The pivot hinge may be screwed or bolted or otherwise secured to the panel and to the ring structure 32. At least one (in the illustrated example embodiment two) steel leg torsion spring respectively acts on each panel 24 about the pivot axis of the pivot bearing arrangement 31, to urge the respective panel into an unfolded, extended deployed position. A respective pivot axis of each one of the pivot bearing hinges is angularly tilted by a twist angle of more than 0° and less than or equal to 20° relative to a circumferential line around the spacecraft body, to ensure that the panels 24 can overlap one another and slide relative to one another without obstruction when moving from the stored transport condition to the deployed condition.

Furthermore, the panels 24 are connected to and actuated by an unfolding or deploying and locking mechanism, to move the panels 24 from their transport position in which they extend parallel to the axis and lie closely along the structure of the reentry vehicle 22, into the unfolded deployed position in which the panels extend or protrude radially outwardly away from the reentry vehicle 22. Furthermore, the mechanism holds or locks the panels 24 in the extended deployed position. This mechanism includes compression struts 25, an unfolding pipe ring or panel support and unfolding ring 28, slide rods 29, and tension springs 33.

Particularly, each individual panel is connected and braced respectively by at least one compression strut 25 extending between the respective panel 24 and the unfolding pipe 28 that circles around the body of the reentry vehicle 22. In the present example embodiment, each compression strut 25 comprises a metal pipe with respective ball joints or articulated bearing joints 26 and 27 at the two ends thereof. The first ball joint 26 connects the compression strut 25 with the associated individual panel 24, while the second ball joint 27 provided at the end of the compression strut 25 opposite the panel 24 is connected to the central unfolding pipe 28 forming a ring around the reentry vehicle 22.

The unfolding ring 28 glides or slides in a low-friction manner along slide rods 29 mounted on the outer structure of the reentry vehicle 22, with the slide rods 29 extending axially parallel to the central longitudinal axis of the reentry vehicle 22. Thus, the unfolding ring 28 can slide along the slide rods 29 parallel to the axis of the reentry vehicle 22, and thereby deploys the foldable deployable structure 23 from the folded condition to the deployed condition. This is shown by the transition from FIG. 8 to FIG. 9. As the unfolding ring 28 slides axis-parallel along the reentry vehicle 22, the compression struts 25 act as toggle levers to push the individual panels 24 outwardly by pivoting the panels 24 about the pivot bearing arrangements 31. Note that the unfolding ring 28 may travel over-center, i.e. beyond the point of maximum extension of the compression struts 25 at which the angle of the compression struts relative to the central axis crosses through 90°, along the slide rods 29 to reach the final deployed position shown in FIG. 9. This over-center travel helps to lock the arrangement in the deployed condition. With or without such over-center travel, the arrangement can be locked in the deployed unfolded position by a locking spring arrangement 30 provided on each slide rod 29, whereby the unfolding ring 28 is engaged and locked by the locking spring arrangements 30 once the unfolding ring 28 reaches the end position of travel along the slide rods 29.

The unfolding deployment process of the panels 24 is driven by a plurality of tension springs 33, for example one tension spring 33 per panel 24, or some other number of tension springs, that are connected and extend between the unfolding ring 28 and respective mounting brackets 36 connected to the structure of the reentry vehicle 22. In the present example embodiment, the tension springs 33 are steel springs. In the folded condition shown in FIG. 8, the springs 33 are extended under tension, and in the deployed condition shown in FIG. 9 these springs 33 are contracted but preferably still have some tension to help hold the unfolding ring 28 and thus the struts 25 in the deployed position. Thus, the totality of the tension springs 33 forms a common drive for extending and deploying all of the panels 24 to carry out the unfolding deployment and locking process. The pivoting of each individual panel 24 is further supported or driven by the respective steel leg torsion springs 34 acting about the pivot bearing arrangements 31 as described above.

Figure 8:
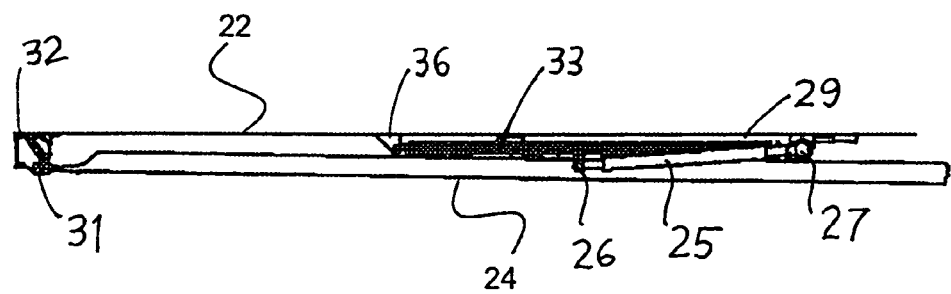
FIG. 8 is a detail view of a portion of the arrangement according to FIG. 6, particularly showing a section through the foldable deployable structure mounted on one side of the reentry vehicle, in a folded closed condition of the foldable deployable structure.
Figure 9:
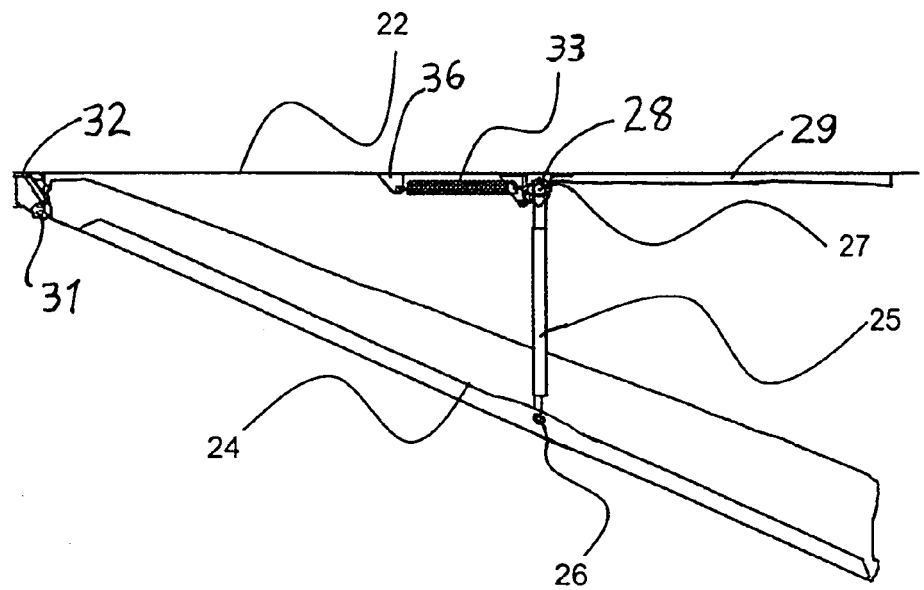
FIG. 9 is a detail sectional view similar to FIG. 8, but showing the foldable deployable structure in the unfolded opened condition.
Figure 10:
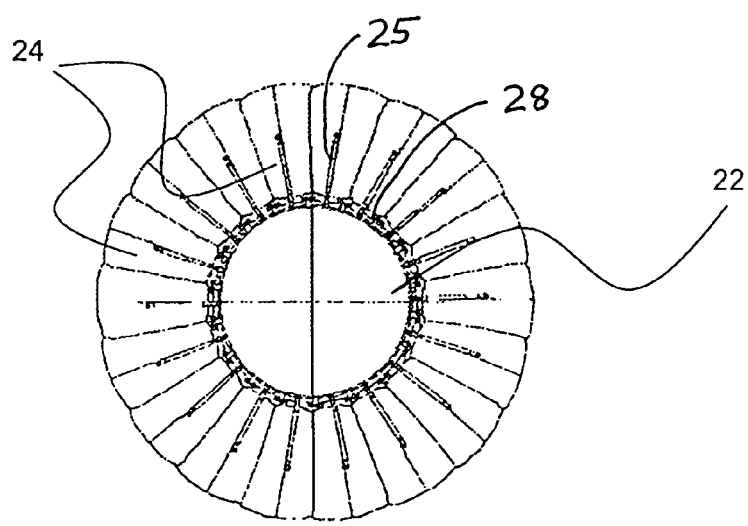
FIG. 10 is an end plan view of the foldable deployable structure in the unfolded opened condition according to FIGS. 6A and 7.

Furthermore, the arrangement can be fixed and held in the folded stowed condition of FIG. 8 by any suitable releasable securing arrangement, for example to hold the unfolding ring 28 in the stowed position as shown in FIG. 8. For example, such a releasable securing arrangement can involve explodable or shearable bolts or releasable catch pawls that hold the unfolding ring 28 in the position shown in FIG. 8 against the tension of the extended springs 33, until such securing arrangements are triggered and released to initiate the deployment process driven by the springs 33.

The suspension or pivotable mounting of the individual panels 24 via the pivot bearing arrangements 31 is designed so that the respective adjacent neighboring panels can easily rotate and slide overlappingly relative to one another during the unfolding deployment operation, without excessive rubbing friction or hindrance of one panel relative to another. For this reason, the respective pivot bearing arrangements 31 of neighboring panels 24 are slightly rotated or twisted by a twist angle of more than 0° and less than or equal to 20° relative to a circumferential line around the spacecraft body, on the ring structure 32 of the reentry vehicle 22 as pointed out above. Also, the panels and other components are arranged so that the longitudinal edge portions of neighboring panels 24 will still overlap one another in the unfolded deployed condition. Such an overlapping of the longitudinal edges of the panels prevents hot reentry gases from flowing through between neighboring panels so that a heating of spacecraft components located behind the panels 24 is reliably prevented. In this regard, the adjoining edges of neighboring panels can also catch or interengage one another in the fully deployed condition so that the overlapping longitudinal edge portions engaging one another form a substantially rigid, closed, continuous fixed heat shield structure. Also, the individual panels 24 can be provided with reinforcing ribs extending therealong, to strengthen and stiffen the panels and the resulting heat shield structure.

The above example embodiment was described in connection with a foldable deployable structure mounted on the rear or trailing end portion of a spacecraft which is oriented toward the rear opposite the flight direction upon entry of the spacecraft into the atmosphere. In this regard, the foldable deployable structure functions simultaneously as a braking or decelerating shield or chute and as a flight stabilizer. It should be understood, that such a foldable deployable structure can alternatively or additionally be arranged on the forward end of a spacecraft facing in the flight direction during entry into the atmosphere, for example as illustrated and described in connection with FIGS. 1 to 5. It should be further understood that the unfolding deploying and locking mechanism described in connection with the rear end embodiment of FIGS. 6 to 10 can be used in the same manner for the forward end embodiment of FIGS. 1 to 5. In such a case, the unfolding deploying and locking mechanism opens the panels 24 in a direction opposite the flight direction.

As described above, the panels 24 are preferably fabricated as relatively thin-walled panels of a high-temperature-resistant fiber-reinforced ceramic material that is additionally strengthened and stiffened with stiffening elements such as additional structural ribs. On the other hand, the other essential structural or supporting elements of the inventive apparatus are fabricated either also of such a ceramic material or of a high strength high-temperature-resistant metal such as the metal material designated as PM 1000. Thus, such a material can be used especially to fabricate the compression struts 25 including the ball joints 26 and 27, the unfolding ring 28, as well as the pivot bearing arrangements 31 of the panels 24.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a spacecraft having a spacecraft body and a shield arrangement mounted on said spacecraft body, wherein said shield arrangement is selectively deployable to a deployed configuration and selectively retractable to a retracted configuration, and wherein said shield arrangement provides heat protection and deceleration of said spacecraft body with said shield arrangement deployed in said deployed configuration when said spacecraft enters from space into an atmosphere, an improvement wherein:

said shield arrangement comprises a plurality of individual panels made of a high temperature resistant fiber reinforced ceramic material, said individual panels are movably connected to and extendable relative to said spacecraft body to be deployable to said deployed configuration, said individual panels overlap one another along longitudinal edge portions of said panels to form a deployed shield in said deployed configuration, said individual panels are not connected directly to one another, said shield arrangement further comprises a panel actuating ring that extends around and is movably connected to said spacecraft body so as to be movable along said spacecraft body parallel to an axis of said spacecraft body, and a plurality of compression struts that each respectively have first and second articulated bearing joints respectively on opposite first and second ends thereof, and said first articulated bearing joints of said compression struts are respectively connected to said individual panels and said second articulated bearing joints of said compression struts are connected to said panel actuating ring, so that a displacement of said panel actuating ring along and parallel to said axis of said spacecraft body is adapted to deploy said panels from said retracted configuration to said deployed configuration.

2. The improvement in the spacecraft according to claim 1, wherein each respective one of said panels respectively overlaps exactly two other ones of said panels that are adjacently neighboring said respective one of said panels along said longitudinal edge portions.

3. The improvement in the spacecraft according to claim 1, wherein said shield arrangement further comprises a plurality of pivot hinges that respectively pivotably connect respective inboard ends of said panels to said spacecraft body, and wherein a respective pivot axis of each one of said pivot hinges is angularly tilted by a twist angle of more than 0° and less than or equal to 20° relative to a tangent of a circumferential circle around said axis of spacecraft body.

4. The improvement in the spacecraft according to claim 1, wherein said fiber reinforced ceramic material of said panels is a carbon fiber reinforced ceramic material.

5. The improvement in the spacecraft according to claim 1, wherein said fiber reinforced ceramic material of said panels is able, without ablating and without burning-up, to withstand temperatures arising when said spacecraft enters from space into an atmosphere.

6. The improvement in the spacecraft according to claim 1, wherein said shield arrangement further comprises slide rods mounted on, and extending longitudinally parallel to said axis of, said spacecraft body, wherein said panel actuating ring is mounted slidably on said slide rods to movably connect said panel actuating ring to said spacecraft body.

7. The improvement in the spacecraft according to claim 1, wherein said shield arrangement further comprises a plurality of tension springs connected under tension between said spacecraft body and said panel actuating ring to urge said panel actuating ring in a direction parallel to said axis toward a position of said panel actuating ring in said deployed configuration.

8. The improvement in the spacecraft according to claim 1, wherein said compression struts including said articulated bearing joints, and said panel actuating ring are made of a high strength and high temperature resistant metal or a fiber reinforced ceramic.

9. The improvement in the spacecraft according to claim 1, wherein said panel actuating ring is lockable in a position thereof in said deployed configuration by an over-center travel of said panel actuating ring parallel to said axis whereby an angle of said compression struts relative to said axis crosses 90°.

10. The improvement in the spacecraft according to claim 1, wherein said shield arrangement further comprises at least one locking spring arrangement that lockingly engages and holds said panel actuating ring in said deployed configuration.

11. The improvement in the spacecraft according to claim 1, wherein said shield arrangement is arranged on a forward end portion of said spacecraft body that faces forwardly in a flight direction of said spacecraft in the atmosphere.

12. The improvement in the spacecraft according to claim 1, wherein said shield arrangement is arranged on a rear end portion of said spacecraft body that faces rearwardly opposite a flight direction of said spacecraft in the atmosphere.

13. The improvement in the spacecraft according to claim 1, wherein said shield arrangement is asymmetrical.

14. The improvement in the spacecraft according to claim 1, wherein said panels are movably connected and arranged relative to said spacecraft body so that retracting said panels to said retracted configuration involves increasing a degree of overlap of said panels relative to one another on said longitudinal edge portions thereof.

15. The improvement in the spacecraft according to claim 14, wherein said panels are movably connected and arranged relative to said spacecraft body so that retracting said panels to said retracted configuration involves pivoting outboard ends of said panels from said deployed configuration inwardly toward said axis of said spacecraft body so as to reduce an angle between said axis and each respective one of said panels and also involve partially rotating said outboard ends of said panels around said axis of said spacecraft body to reach said retracted configuration.

16. The improvement in the spacecraft according to claim 1, wherein said shield arrangement further comprises a plurality of pivot hinges that respectively pivotably connect respective inboard ends of said panels to said spacecraft body, and a plurality of torsion leg springs arranged on said pivot hinges to pivotally urge said panels toward positions thereof in said deployed configuration.

17. The improvement in the spacecraft according to claim 16, wherein said pivot bearing hinges are made of high temperature resistant metal, PM 1000 metal material, or a fiber reinforced ceramic.

18. In a spacecraft having a spacecraft body and a shield arrangement mounted on said spacecraft body, wherein said shield arrangement is selectively deployable to a deployed configuration and selectively retractable to a retracted configuration, and wherein said shield arrangement provides heat protection and deceleration of said spacecraft body with said shield arrangement deployed in said deployed configuration when said spacecraft enters from space into an atmosphere, an improvement wherein:
  said shield arrangement comprises a plurality of individual panels that are made of a high temperature resistant material and that together form a shield,
  said panels are movably connected to and extendable relative to said spacecraft body to be deployable to said deployed configuration,
  said panels slidably variably overlap one another along longitudinal edge portions of said panels,
  said individual panels are not connected directly to one another,
  said shield arrangement further comprises a plurality of pivot hinges that respectively pivotably connect respective inboard ends of said panels to said spacecraft body, and wherein a respective pivot axis of each one of said pivot hinges is angularly tilted by a twist angle of more than 0° and up to 20° relative to a tangent of a circumferential circle around said axis,
  said panels are movably connected to said spacecraft body by said pivot hinges and are movably arranged relative to one another and relative to said spacecraft body so that retracting said panels involves pivoting outboard ends of said panels from said deployed configuration angularly inwardly toward an axis of said spacecraft body so as to reduce an angle between said axis and each respective one of said panels and also involves partially rotating said outboard ends in a circumferential direction around said axis, and
  said panels are movably connected to said spacecraft body by said pivot hinges and are movably arranged relative to one another and relative to said spacecraft body so that retracting said panels also involves sliding said panels relative to one another to slidingly increase a degree of said overlap of said panels relative to one another on said longitudinal edge portions, and so that deploying said panels involves sliding said panels relative to one another to slidingly decrease said degree of said overlap of said panels relative to one another on said longitudinal edge portions.

19. The improvement in the spacecraft according to claim 18, wherein all of said panels making up said shield have a same size, same shape, and same arrangement as one another.

20. The improvement in the spacecraft according to claim 18, wherein each one of said panels includes a first one and a second one of said longitudinal edge portions respectively along opposite longitudinal edges thereof, and wherein said first one of said longitudinal edge portions of each respective one of said panels overlaps over said second one of said longitudinal edge potions of a neighboring one of said panels adjacent to said respective one of said panels, and said second one of said longitudinal edge portions of each said respective one of said panels overlaps under said first one of said longitudinal edge portions of another neighboring one of said panels adjacent to said respective one of said panels.

21. The improvement in the spacecraft according to claim 18, wherein all of said panels in said retracted configuration extend longitudinally parallel to and circumferentially around said axis.

22. The improvement in the spacecraft according to claim 18, wherein said high temperature resistant material of said panels is a fiber reinforced ceramic.

23. The improvement in the spacecraft according to claim 18, wherein
  said shield arrangement further comprises a panel actuating ring that extends around and is movably connected to said spacecraft body so as to be movable along said spacecraft body parallel to said axis of said spacecraft body, and a plurality of compression struts that each respectively have first and second articulated bearing joints respectively on opposite first and second ends thereof,
  said first articulated bearing joints of said compression struts are respectively connected to said individual panels and said second articulated bearing joints of said compression struts are connected to said panel actuating ring, so that a displacement of said panel actuating ring along and parallel to said axis of said spacecraft body is adapted to deploy said panels from said retracted configuration to said deployed configuration,
  said shield arrangement further comprises a plurality of tension springs connected under tension between said spacecraft body and said panel actuating ring to urge said panel actuating ring in a direction parallel to said axis toward a position of said panel actuating ring in said deployed configuration, and
  said shield arrangement further comprises a plurality of torsion springs arranged on said pivot hinges to pivotably urge said panels toward positions thereof in said deployed configuration.

* * * * *